US010579058B2

(12) United States Patent
Oh et al.

(10) Patent No.: US 10,579,058 B2
(45) Date of Patent: Mar. 3, 2020

(54) APPARATUS AND METHOD FOR GENERATING TRAINING DATA TO TRAIN NEURAL NETWORK DETERMINING INFORMATION ASSOCIATED WITH ROAD INCLUDED IN IMAGE (71) Applicant: SAMSUNG ELECTRONICS CO., LTD., Suwon-si (KR)

(72) Inventors: Dokwan Oh, Suwon-si (KR); Dae Hyun Ji, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 148 days.

(21) Appl. No.: 15/704,282

(22) Filed: Sep. 14, 2017

(65) Prior Publication Data
US 2018/0164812 A1 Jun. 14, 2018

(30) Foreign Application Priority Data
Dec. 14, 2016 (KR) .................. 10-2016-0170271

(51) Int. Cl.
G05D 1/08 (2006.01)
G05D 1/00 (2006.01)
G06N 3/02 (2006.01)
G06F 17/18 (2006.01)
G06T 7/70 (2017.01)
(Continued)

(52) U.S. Cl.
CPC ............ *G05D 1/0088* (2013.01); *G06F 17/18* (2013.01); *G06K 9/00791* (2013.01); *G06K 9/6256* (2013.01); *G06N 3/02* (2013.01); *G06N 7/005* (2013.01); *G06T 7/70* (2017.01); *G06F 16/00* (2019.01)

(58) Field of Classification Search
CPC ...... G05D 1/0088; G05D 1/00; G06K 9/6256; G06K 9/00791; G06N 7/005; G06N 3/02; G06N 20/00; G06N 3/08; G06T 7/70; G06F 17/18; G06F 16/00; H04N 5/225
See application file for complete search history.

(56) References Cited

U.S. PATENT DOCUMENTS

| 2016/0140452 | A1  | 5/2016 | Garcia Sedano et al. |
| 2017/0008521 | A1* | 1/2017 | Braunstein ............. G01C 21/32 |
| 2018/0025646 | A1* | 1/2018 | Jeon ....................... B62D 6/002 |
| | | | 701/41 |

FOREIGN PATENT DOCUMENTS

| JP | 2012-208052 A | 10/2012 |
| KR | 10-2008-0083823 A | 9/2008 |

(Continued)

OTHER PUBLICATIONS

Laddha, Ankit. "Road Detection and Semantic Segmentation without Strong Human Supervision". Carnegie Mellon University, Jul. 29, 2016.*

*Primary Examiner* — Nadeem Odeh
*Assistant Examiner* — Michael V Kerrigan
(74) *Attorney, Agent, or Firm* — Sughrue Mion, PLLC (57) ABSTRACT A training data generation method includes acquiring an image captured from a vehicle and location information of the vehicle corresponding to the image; acquiring map data corresponding to the acquired location information; determining truth data including information associated with a road included in the image from the acquired map data; and generating training data including the image and the determined truth data.

10 Claims, 8 Drawing Sheets

(51) Int. Cl.
  *G06N 7/00* (2006.01)
  *G06K 9/62* (2006.01)
  *G06K 9/00* (2006.01)
  *G06F 16/00* (2019.01)

(56) References Cited

FOREIGN PATENT DOCUMENTS

| | | |
|---|---|---|
| KR | 10-2010-0008716 A | 1/2010 |
| KR | 10-2015-0084143 A | 7/2015 |

\* cited by examiner

APPARATUS AND METHOD FOR GENERATING TRAINING DATA TO TRAIN NEURAL NETWORK DETERMINING INFORMATION ASSOCIATED WITH ROAD INCLUDED IN IMAGE

CROSS-REFERENCE TO RELATED APPLICATION(S)

This application claims the benefit under 35 USC § 119(a) of Korean Patent Application No. 10-2016-0170271, filed on Dec. 14, 2016, in the Korean Intellectual Property Office, the entire disclosure of which is incorporated herein by reference for all purposes.

BACKGROUND

1. Field

The following description relates to a neural network to extract information associated with a road from an image, and an apparatus and method for generating training data used to train the neural network.

2. Description of Related Art

A neural network is a model obtained by expressing selected characteristics of human biological neurons, and generating mapping between input data and output data. A supervised machine learning method is a method of training a neural network based on input data and truth data corresponding to the input data. When the neural network is trained based on the truth data, output data output by the neural network in response to input data converges to truth data corresponding to the input data.

To train a neural network, a large quantity of input data and training data are generated. Generally, a person manually extracts information from input data, to generate training data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a training data generation method includes acquiring an image captured from a vehicle and location information of the vehicle corresponding to the image, acquiring map data corresponding to the acquired location information, determining truth data including information associated with a road included in the image from the acquired map data, and generating training data including the image and the determined truth data.

The acquiring of the map data may include acquiring the map data by navigating through a map database (DB) based on the acquired location information.

The acquiring of the map data may include acquiring the map data based on a direction in which the image is captured.

The truth data may include a probability that the vehicle moves in the direction.

The truth data may include a number of roads accessible by the vehicle when the vehicle moves forward.

The truth data may include a gradient of the road determined based on coordinates of a location of the vehicle corresponding to the image and coordinates adjacent to the coordinates.

The truth data may include a probability that the road is matched to a predetermined road type.

The training data generation method may further include training a neural network based on the generated training data.

In another general aspect, a training data generation apparatus for generating training data from an image of a front view captured from a vehicle includes a processor. The processor is configured to acquire the image and location information of the vehicle corresponding to the image, to acquire map data corresponding to the acquired location information, to determine truth data including information associated with a road included in the image from the acquired map data, and to generate training data including the image and the determined truth data.

The processor may be further configured to acquire the map data by navigating through a map DB based on the acquired location information.

The processor may be further configured to acquire the map data based on a direction in which the image is captured and configured to determine truth data including a probability that the vehicle moves in the direction.

The truth data may include a probability that the road is matched to a predetermined road type.

The processor may be further configured to train a neural network based on the generated training data.

In still another general aspect, a road recognition method includes acquiring an image by capturing a road on which a vehicle travels, determining information associated with the road by inputting the acquired image to a neural network that is trained by machine learning, and controlling the vehicle based on the determined information.

The determining of the information may include determining a probability that the road is matched to a predetermined road type.

The controlling of the vehicle may include determining whether either or both of a lane marking is not visible and the navigation information is unsuitable; and, controlling the vehicle based on a movement of another vehicle in response to the determining.

The controlling of the vehicle may include determining whether the vehicle enters an intersection based on the determined information, controlling the vehicle based on a movement of a preceding vehicle located in front of the vehicle in response to the vehicle entering the intersection, and controlling the vehicle based on a lane marked on the road in response to the vehicle not entering the intersection.

The neural network may be trained based on truth data generated by navigating through a map DB based on a location at which the image is captured.

The road recognition method may further include sending a request to generate training data based on the image and a location at which the image is captured, to train the neural network.

In another general aspect, a non-transitory computer-readable storage medium may store instructions that, when executed by a processor, cause the processor to perform the method described above.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limiting, but it is intended that various modifications, equivalents, and alternatives are also covered within the scope of the claims.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Examples may be implemented as various products, for example, personal computers (PC), laptop computers, tablet computers, smartphones, televisions (TV), smart home appliances, intelligent vehicles, kiosks or wearable devices. Hereinafter, examples will be described in detail with reference to the accompanying drawings, and like reference numerals in the drawings refer to like elements throughout.

Figure 1:
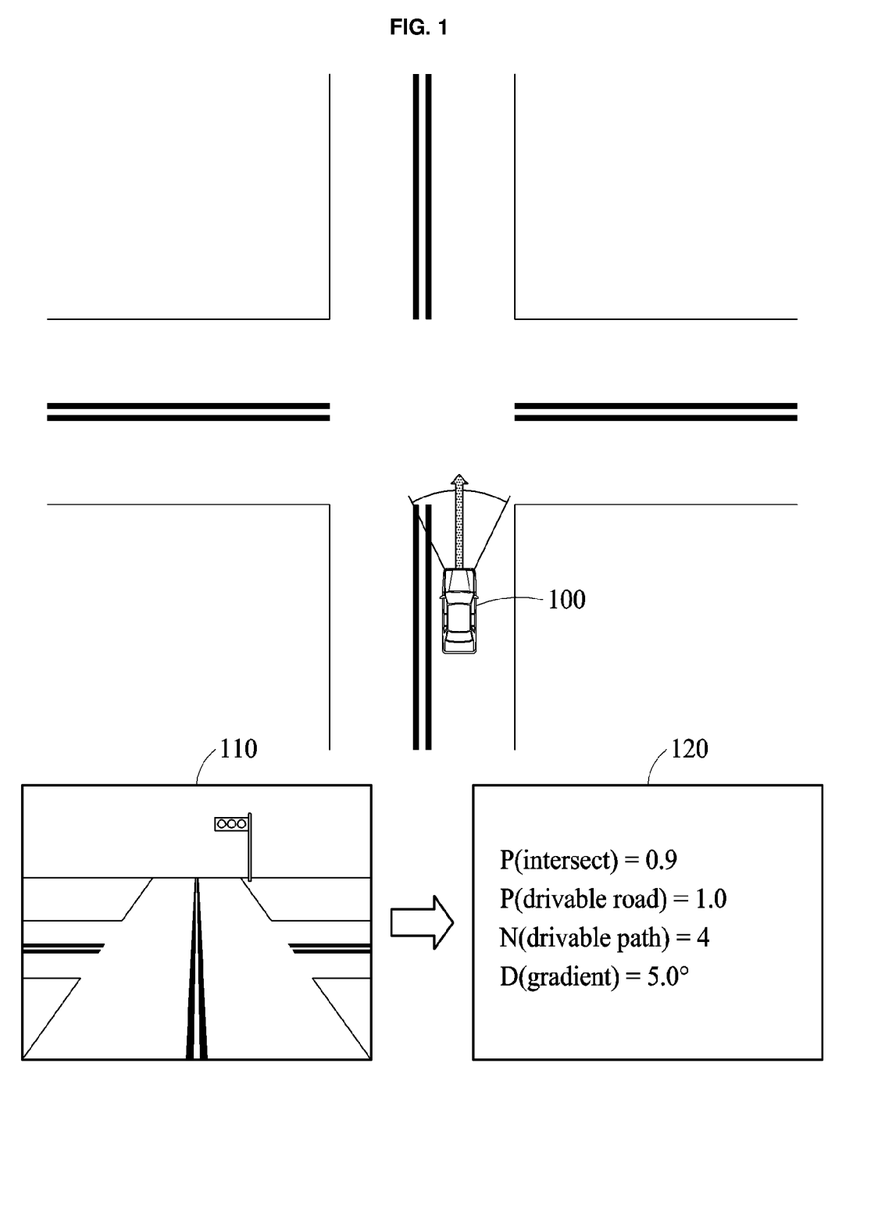
FIG. 1 is a diagram illustrating an example in which a training data generation apparatus generates training data from an image captured by a vehicle.

FIG. 1 illustrates an example in which a training data generation apparatus generates training data from an image 110 captured by a vehicle 100.

The training data is data input to a neural network to train the neural network. Referring to FIG. 1, the training data includes the image 110 and truth data 120 determined from the image 110. The training data generation apparatus determines the truth data 120 based on the image 110 and a location at which the image 110 is captured. The training data generation apparatus generates the training data including the image 110 and the truth data 120.

The truth data 120 includes correct information output by the neural network from the image 110. The truth data 120, in this example, includes a ground truth.

The neural network receives the training data generated by the training data generation apparatus. When the neural network is trained based on the training data, output data output from the neural network based on the image 110 converges to the truth data 120. The trained neural network is utilized in a road recognition apparatus for recognizing a condition of a road on which the vehicle 100 travels based upon the image 110.

Referring to FIG. 1, the truth data 120 generated by the training data generation apparatus includes at least one of a probability P(intersect) that a road included in the image 110 is an intersection, a probability P(drivable road) that a road is drivable, a number N(drivable path) of drivable roads included in the image 110, or a gradient D(gradient). Accordingly, the neural network trained on the truth data 120 distinguishes a lane from a road in the image 110, and detects a type of a road from the image 110. In addition, the neural network trained on the truth data 120 determines high-level information about a road as information used for driving from the image 110.

Thus, the road recognition apparatus detects a type of a road from the image 110 using the neural network. By detecting the type of the road in an expedited manner suitable for the speed of the vehicle, the road recognition apparatus more quickly, accurately, and safely controls the vehicle 100.

Figure 2:
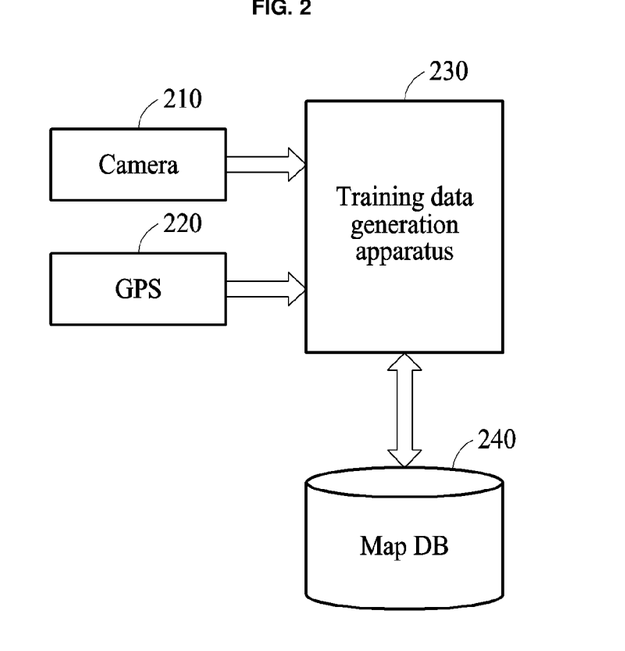
FIG. 2 is a diagram illustrating an example of a structure of a training data generation apparatus.

FIG. 2 illustrates an example of a structure of a training data generation apparatus 230. The training data generation apparatus 230 generates training data from an image of, for example, a front view captured from a vehicle. The training data generation apparatus 230 includes a processor.

Referring to FIG. 2, the training data generation apparatus 230 acquires, from a camera 210, an image of a front view captured from a vehicle. The image includes an image portion representing a road on which the vehicle travels. The training data generation apparatus 230 acquires location information of the vehicle corresponding to the acquired image from a global positioning system (GPS) sensor 220, or other suitable positioning system. The training data generation apparatus 230 acquires location information about a location at which the image is captured.

The training data generation apparatus 230 is connected to a map database (DB) 240 to acquire map data corresponding to the acquired location information. The map DB 240 is connected to the training data generation apparatus 230 via, for example, the Internet or other communication networks. In some embodiments, the map DB 240 (or portions thereof) may be stored locally (such as on a local storage memory, for example, e.g. flash, or a hard drive, DVD, or other suitable storage) for faster access and periodically updated via the communication networks.

The training data generation apparatus 230 acquires an image and map data corresponding to the image from the map DB 240. The training data generation apparatus 230 receives the image and the map data corresponding to the image by parsing the map DB 240.

For example, the training data generation apparatus 230 includes the map DB 240. In this example, the training data generation apparatus 230 acquires map data corresponding to the location information even though a communication network is not used.

The training data generation apparatus 230 determines truth data that includes information associated with a road that lies ahead of the vehicle and that is included in the image, from the acquired map data. For example, the truth data is determined by digitizing the information associated with the road based on the truth data 120 of FIG. 1. The truth data includes, for example, information associated with a road which is acquirable from map data as well as information about objects included in an image.

Figure 3:
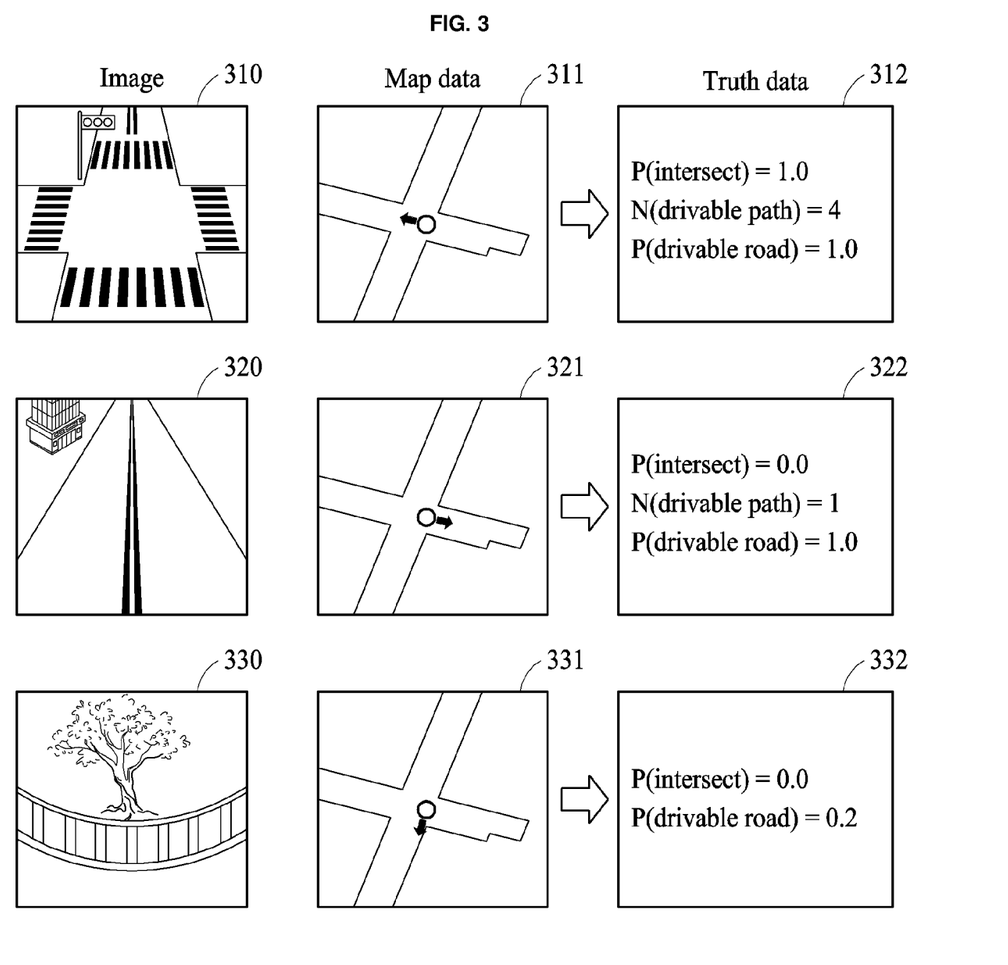
FIG. 3 is a diagram illustrating an example in which a training data generation apparatus determines truth data respectively corresponding to images.

FIG. 3 illustrates an example in which a training data generation apparatus determines truth data 312, 322 and 332 respectively corresponding to images 310, 320 and 330. In FIG. 3, the image 310 is determined to be an image acquired by capturing a middle area of an intersection at an entrance of the intersection, and the image 320 is determined to be an image acquired by capturing one of roads connected to an intersection along an outgoing lane of the intersection. The image 330 is determined to be an image acquired by capturing a sidewalk at a predetermined point around an intersection.

The training data generation apparatus receives the image 310 and information about a location at which the image 310 is captured. When the image 310 is collected by a camera included in a vehicle that is traveling, the information about the location at which the image 310 is captured is determined based on a location of the vehicle. The information about the location at which the image 310 is captured includes GPS coordinates. In some embodiments, a compass or magnet sensor (such as a magnetometer) is employed to determine a heading or direction to further refine the location of the image 310.

The training data generation apparatus acquires map data 311 corresponding to the location at which the image 310 is captured from map data included in a map DB based on the information about the location at which the image 310 is captured. The map data 311 includes geographical information about the location at which the image 310 is captured. The geographical information includes, for example, information about a road built in the location at which the image 310 is captured or information used to pass through the location at which the image 310 is captured.

The training data generation apparatus is connected to the map DB that provides the image 310 and the map data 311 corresponding to the image 310. For example, the training data generation apparatus substantially simultaneously receives the image 310 and the map data 311 from the connected map DB. In this example, the training data generation apparatus receives the map data 311 instead of navigating through the map DB based on the information about the location at which the image 310 is captured.

The training data generation apparatus generates the truth data 312 corresponding to the image 310 based on the map data 311. The truth data 312 includes information associated with a road included in the image 310. Because the map data 311 is used by the training data generation apparatus, the truth data 312 is used to accurately detect a type of the road included in the image 310.

The training data generation apparatus sorts map data based on the location at which the image 310 is captured. In FIG. 3, an azimuth angle (for example, a direction in which each of the images 310 through 330 is captured) of each of the images 310 through 330 is represented by an arrow in each of the map data 311, 321 and 331. The training data generation apparatus sorts the map data 311 based on an azimuth angle or a direction in which the image 310 is captured. The training data generation apparatus determines truth data based on the sorted map data.

The truth data 312 includes a probability P(intersect) that a road included in the image 310 is an intersection, a probability P(drivable road) that the road included in the image 310 is drivable, and a number N(drivable path) of drivable roads included in the image 310. The truth data 312 is merely an example, and for example, includes a type of an object included in the image 310 or a distance to the object.

The truth data 312 is determined based on the map data 311 and the direction in which the image 310 is captured. The training data generation apparatus determines the image 310 as an image acquired by capturing a middle area of an intersection at an entrance of the intersection, from the map data 311 sorted based on the location at which the image 310 is captured. Accordingly, the training data generation apparatus determines a probability that the road in the image 310 is an intersection to be a maximum value of "1.0". The training data generation apparatus detects four roads connected to the intersection included in the image 310 from the map data 311. Accordingly, the training data generation apparatus determines the number of drivable roads in the image 310 as "4." The training data generation apparatus detects that the roads in the image 310 are drivable from the map data 311. Accordingly, the training data generation apparatus determines a probability that the roads in the image 310 are drivable to be a maximum value of "1.0".

The training data generation apparatus determines the truth data 322 and 332 respectively corresponding to the images 320 and 330 similarly to the above operation of determining the truth data 312. The training data generation apparatus determines the image 320 as an image acquired by capturing one of the roads connected to an intersection along an outgoing lane of the intersection, based on map data 321 sorted based on a location at which the image 320 is captured. Accordingly, the training data generation apparatus determines a probability that a road in the image 320 is an intersection to be a minimum value of "0.0". The training data generation apparatus determines a number of drivable roads in the image 320 as "1" from the map data 321. Also, the training data generation apparatus determines a probability that the road in the image 320 is drivable to be a maximum value of "1.0".

The training data generation apparatus determines the image 330 as an image acquired by capturing a sidewalk at a predetermined point around an intersection, based on map data 331 sorted based on a location at which the image 330 is captured. The training data generation apparatus determines a probability that a road included in the image 330 is drivable, based on an angle between the road and a direction in which the image 330 is captured. The training data generation apparatus determines that the probability that the road in the image 330 is drivable to be "0.2" that is relatively lower than the probability that the road included in the image 320 is drivable.

The training data generation apparatus generates training data including a pair of the image 310 and the truth data 312, a pair of the image 320 and the truth data 322 and a pair of the image 330 and the truth data 332. The training data generation apparatus trains a neural network based on the generated training data. The trained neural network is used to determine, from the images 310 through 330, a probability P(intersect) that a road included in each of the images 310 through 330 is an intersection, a probability P(drivable road) that a road included in each of the images 310 through 330 is drivable, and a number N(drivable path) of drivable roads included in each of the images 310 through 330.

Thus, the trained neural network identifies an object included in the images 310 through 330 and determines information associated with roads included in the images 310 through 330. The training data generation apparatus directly determines information associated with a road from an image by analyzing the image using the trained neural network.

Figure 4:
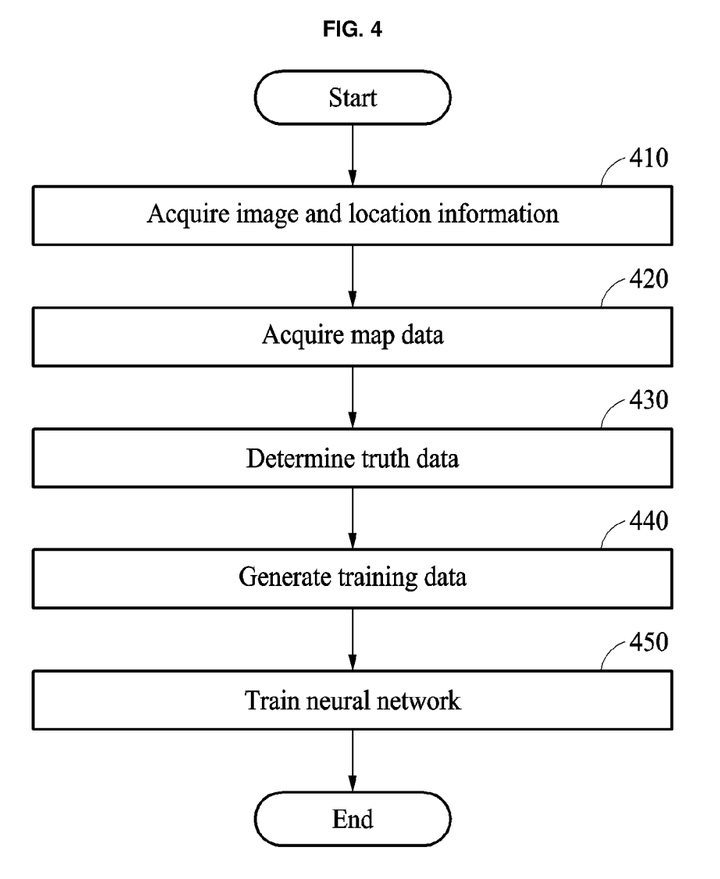
FIG. 4 is a flowchart illustrating an example of a training data generation method performed by a training data generation apparatus.

FIG. 4 illustrates an example of a training data generation method performed by a training data generation apparatus. A non-transitory computer-readable recording medium that stores a program to perform the training data generation method may be provided. The program may include at least one of an application program, a device driver, firmware, middleware, a dynamic link library (DLL) or an applet storing a training data generation method. The training data generation apparatus includes a processor, and the processor reads a recording medium that stores the training data generation method, to perform the training data generation method.

Referring to FIG. 4, in operation 410, the training data generation apparatus acquires an image of a front view captured from a vehicle, and location information of the vehicle corresponding to the image. When the training data generation apparatus is included in the vehicle, an image acquired by capturing a road lying ahead of the vehicle by a camera included in the vehicle is collected. The training data generation apparatus receives the image and the location information from a GPS sensor and the camera included in the vehicle. For example, when the training data generation apparatus is connected to a communication network, the training data generation apparatus receives an image and a location at which the image is captured from a map DB.

In operation 420, the training data generation apparatus acquires map data corresponding to the acquired location information. The training data generation apparatus acquires the map data by navigating through the map DB based on the acquired location information. For example, the map DB is included in the training data generation apparatus, or may be connected to the training data generation apparatus via a communication network. The training data generation apparatus acquires the map data based on a direction in which the image is captured.

In operation 430, the training data generation apparatus determines truth data including information associated with a road included in the image, from the acquired map data. For example, the training data generation apparatus generates truth data including a result obtained by classifying objects included in an image.

The training data generation apparatus determines a probability that a road included in the image is matched to a preset road type. For example, the training data generation apparatus determines, based on the acquired map data, the probability that the road in the image is matched to the road type. The road type includes, for example, an overpass, an intersection, a one-way traffic road, an underground road, or a road curved at a preset angle or radius of curvature or greater. The training data generation apparatus generates truth data including the determined probability.

Also, the training data generation apparatus determines a probability that a vehicle moves in a direction in which the image is captured, based on the acquired map data. To determine the probability that the vehicle moves in the direction in which the image is captured, the training data generation apparatus sorts the map data based on an azimuth angle or the direction in which the image is captured. The truth data includes the probability that the vehicle moves in the direction in which the image is captured.

In addition, the training data generation apparatus determines, based on the acquired map data, a number of roads accessible by the vehicle when the vehicle travels in the direction in which the image is captured. The truth data includes the determined number of the roads.

The training data generation apparatus identifies, based on the acquired map data, a topography around the location at which the image is captured. For example, the training data generation apparatus detects at least one of coordinates of the location at which the image is captured or coordinates adjacent to the coordinates(for example, coordinates along the expected course of travel adaptively adjusted based on a determined speed of transit) Based on the identified topography, the training data generation apparatus determines a gradient of the road in the image. The truth data includes the determined gradient.

Also, the training data generation apparatus identifies a shape of the road in the image, based on the acquired map data. The truth data includes the identified shape of the road. The shape of the road included in the truth data is generated based on the map data, and accordingly is more exact than a shape of a road identified from the image by a person. Accordingly, a neural network trained based on training data generated by the training data generation apparatus more accurately detects a shape of a road.

In operation 440, the training data generation apparatus generates training data including the image and the determined truth data. For example, the training data includes an image and truth data corresponding to the image. When the training data generation apparatus is connected to the map DB via a communication network (or when the map DB—or portions thereof are stored locally), the training data generation apparatus automatically generates training data by navigating through the map DB.

In operation 450, the training data generation apparatus trains a neural network based on the generated training data. The neural network includes an input layer and an output layer. The neural network includes at least one hidden layer that connects the input layer and the output layer. The training data generation apparatus changes the neural network so that output data output to the output layer in response to an image being input to the input layer converges to truth data corresponding to the input image.

The trained neural network is utilized by a road recognition apparatus included in the vehicle. The road recognition apparatus determines information associated with a road by inputting an image to the trained neural network. The determined information follows a format of truth data in the training data. For example, the truth data is assumed to include a probability that a road is an intersection, a number of accessible roads, a gradient of a road, a probability that a road is drivable, and a shape of a road. In this example, the road recognition apparatus determines, from the image, the probability that the road is an intersection, the number of accessible roads, the gradient of the road, the probability that the road is drivable, and the shape of the road. The road recognition apparatus controls the vehicle including the road recognition apparatus based on the determined information.

Figure 5:
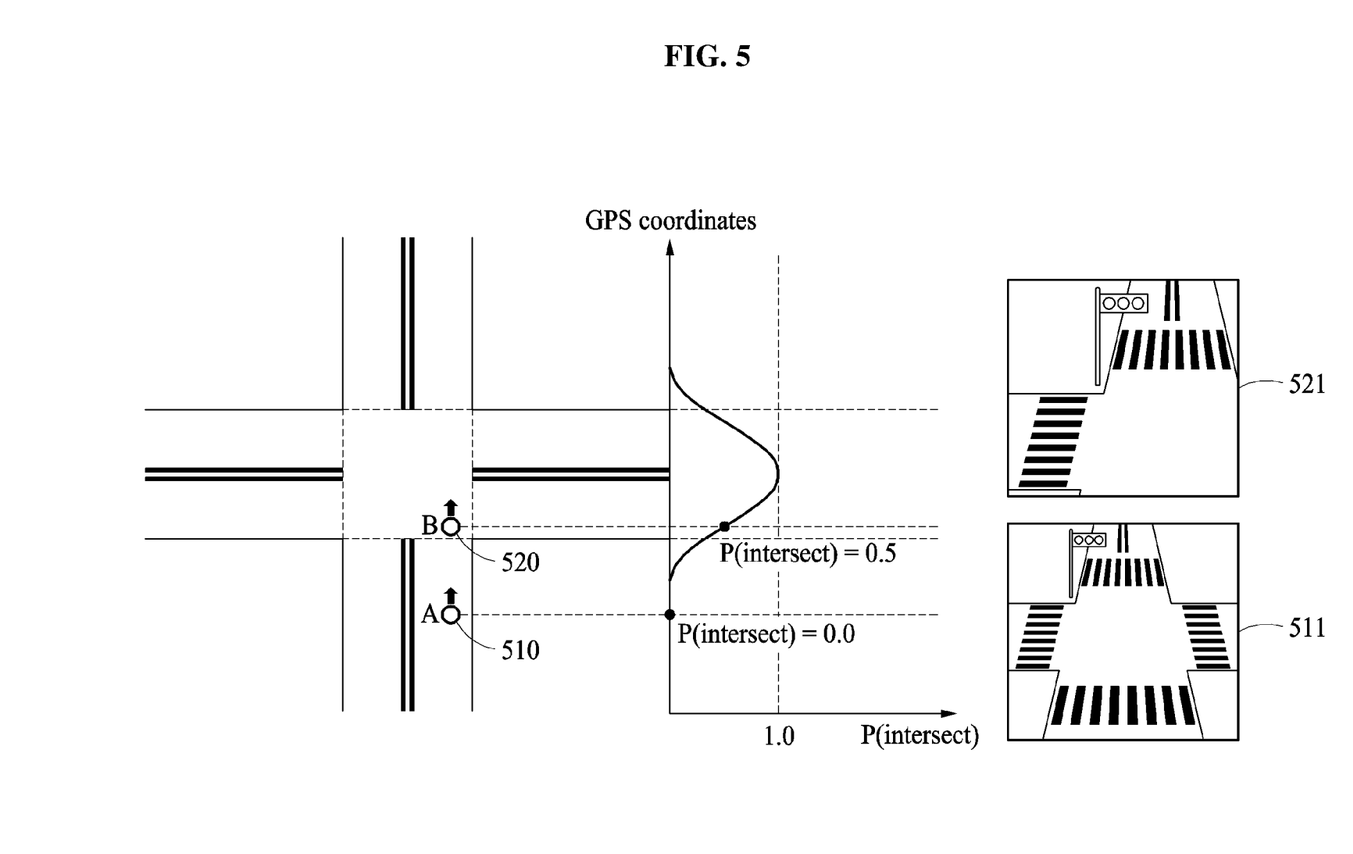
FIG. 5 is a diagram illustrating an example in which a training data generation apparatus determines truth data based on a location at which an image is captured.

FIG. 5 illustrates an example in which a training data generation apparatus determines truth data based on a location at which an image is captured.

FIG. 5 illustrates images 511 and 521 received by the training data generation apparatus and locations A 510 and B 520 at which the images 511 and 521 are captured, respectively. The training data generation apparatus identifies the locations A 510 and B 520 based on location information corresponding to the images 511 and 521. In FIG. 5, the images 511 and 521 are assumed to be captured when a vehicle enters an intersection. The image 511 is assumed to be captured at the location A 510 before the vehicle enters the intersection, and the image 521 is assumed to be captured at the location B 520 on the intersection.

The training data generation apparatus determines truth data based on a location-based probability distribution. The training data generation apparatus determines a type of a road included in an image based on a location at which the image is captured. The training data generation apparatus generates truth data that represents a type of a road as a probability. The probability indicating the type of the road is determined based on the location at which the image is captured. For example, the training data generation apparatus generates a location-based probability distribution based on map data.

Hereinafter, an example in which the training data generation apparatus determines a probability that a road included in an image is an intersection is described with reference to FIG. 5. FIG. 5 illustrates a graph of a probability that a road corresponding to a location is an intersection. The probability that the road is the intersection is determined based on, for example, a Gaussian distribution. For example, the training data generation apparatus determines a probability that a road in an image captured at a middle point of the intersection is an intersection to be a maximum value of "1.0." In this example, when a vehicle moves out of the intersection from the middle point, the probability gradually decreases. When the vehicle moves at least a predetermined distance out of the intersection, the probability has a minimum value of "0."

The training data generation apparatus determines a probability that a road included in each of the images 511 and 521 is an intersection, based on the location-based probability distribution. For example, the training data generation apparatus determines a probability that a road in the image 521 is an intersection to be "1.0" based on the location B 520 at which the image 521 is captured.

Even though the image 521 is captured at the location B 520 on the intersection, the image 521 includes a portion of an image of the intersection. Accordingly, it is difficult for a person to identify, based on the image 521, whether the image 521 is captured at the intersection, or a number of roads connected to the intersection. The training data generation apparatus accurately detects whether the image 521 is captured at the intersection or the number of roads connected to the intersection, even though the image 521 includes a portion of the image of the intersection. The training data generation apparatus generates truth data based on the determined probability, to input exact information about the image 521 to the truth data.

Although the intersection is described, this is merely an example, and the location-based probability distribution may be utilized to identify roads other than the intersection. In an example, the training data generation apparatus determines a probability that a road included in an image is an overpass, based on a probability distribution associated with a location at which the image is captured. In another example, the training data generation apparatus determines a probability that a road included in an image is an underground road, and a probability that the road is in a tunnel. The training data generation apparatus generates truth data based on the determined probabilities. Accordingly, a neural network trained based on the truth data is used to determine information associated with a road included in an image as well as to identify an object included in the image.

Figure 6:
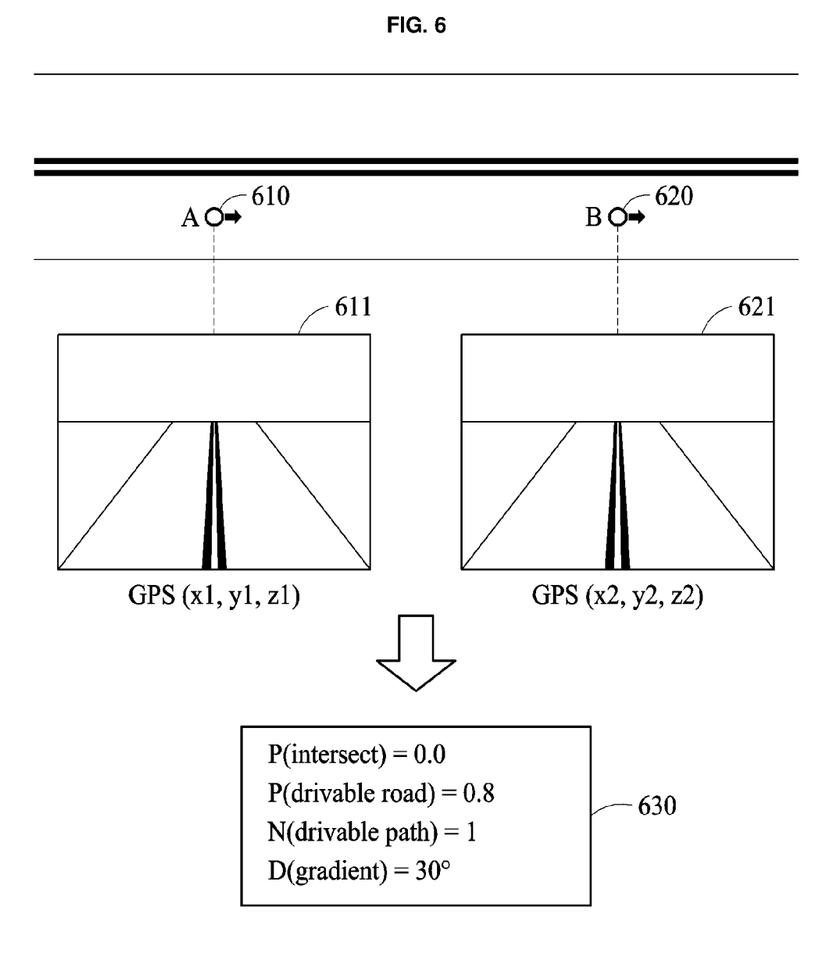
FIG. 6 is a diagram illustrating an example in which a training data generation apparatus measures a gradient of a road included in an image based on a location at which the image is captured.

FIG. 6 illustrates an example in which a training data generation apparatus measures a gradient of a road included in an image based on a location at which the image is captured. Hereinafter, an example in which the training data generation apparatus determines truth data including gradients of roads included in images 611 and 621 from locations A 610 and B 620 at which the images 611 and 621 are captured, is further described with reference to FIG. 6.

In FIG. 6, the images 611 and 621 are captured at the locations A 610 and B 620, respectively. For example, the images 611 and 621 do not include distance information. In this example, accurate determination of the gradients of the roads in the images 611 and 621 is limited. The training data generation apparatus determines the gradients even though the images 611 and 621 do not include distance information.

The training data generation apparatus accurately determines the gradients based on coordinates of each of the locations A 610 and B 620. The training data generation apparatus determines the gradients based on GPS coordinates (x1, y1, z1) of the location A 610 and GPS coordinates (x2, y2, z2) of the location B 620. Truth data 630 generated by the training data generation apparatus includes the determined gradients that are, for example, represented by D(gradient) in FIG. 6. In FIG. 6, the training data generation apparatus determines the gradients as 30 degrees.

The training data generation apparatus trains a neural network based on the images 611 and 621 and the truth data including the gradients. The trained neural network determines a gradient of a road from an image.

Although the gradients are described, this is merely an example, and the training data generation apparatus determines other information associated with a road included in an image based on a location at which the image is captured. For example, the training data generation apparatus generates truth data including a curvature of a road included in an image, based on either one or both of map data and a location at which the image is captured. Additional sensors may be employed to discern truth data. The training data generation apparatus trains a neural network based on the generated truth data to determine the curvature of the road from the image.

Figure 7:
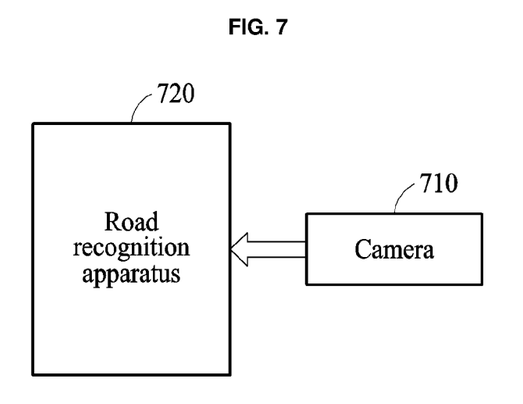
FIG. 7 is a diagram illustrating an example of a structure of a road recognition apparatus that uses a neural network trained by a training data generation apparatus.

FIG. 7 illustrates an example of a structure of a road recognition apparatus 720 that uses a neural network trained by a training data generation apparatus. The road recognition apparatus 720 analyzes an image based on the trained neural network. Hereinafter, an example in which a movement of a vehicle including the road recognition apparatus 720 is determined based on the road recognition apparatus 720 is further described.

Referring to FIG. 7, the road recognition apparatus 720 is connected to a camera 710. The camera 710 and the road recognition apparatus 720 are included in a vehicle. The camera 710 captures an image of a front view, a rear view and/or a side view from the vehicle. In one or more embodiments a 360 degree camera capturing a surround image, or a composite camera system employing a plurality of cameras to capture a plurality of views may be employed. The camera 710 transmits the image to the road recognition apparatus 720.

The road recognition apparatus 720 determines road information associated with a road included in an image from the image using a neural network trained by the training data generation apparatus. As described above, training data generated by the training data generation apparatus represents a probability that a road included in an image is matched to a predetermined road type. Accordingly, the road recognition apparatus 720 determines a probability that a road included in an image is matched to a predetermined road type. The road recognition apparatus 720 identifies a road or a lane from the image. Also, the road recognition apparatus 720 identifies a type of a road or a gradient of a road.

The road recognition apparatus 720 controls the vehicle based on the determined road information. The vehicle including the road recognition apparatus 720 assists a driver to control the vehicle, or controls a movement of the vehicle without an operation of the driver. The road recognition apparatus 720 identifies a lane from the image and controls the vehicle based on the identified lane. The road recognition apparatus 720 identifies a preceding vehicle that travels forward from the image, and controls the vehicle based on the identified preceding vehicle.

The road recognition apparatus 720 determines, based on the determined road information, whether to control the vehicle based on the identified lane or to control the vehicle based on the identified preceding vehicle. When the vehicle travels a typical road, the road recognition apparatus 720 controls the vehicle based on the identified lane. When the vehicle enters an intersection, the road recognition apparatus 720 controls the vehicle based on the identified preceding vehicle because a lane is not marked on the intersection. In other words, when lane identification is not available, the road recognition apparatus 720 adaptively engages a follow mode of a preceding vehicle.

The road recognition apparatus 720 determines a probability that the vehicle is on an intersection. The road recognition apparatus 720 compares the probability that the vehicle is on the intersection to a preset probability threshold and determines whether to control the vehicle based on the identified lane or to control the vehicle based on the identified preceding vehicle. When the probability that the vehicle is on the intersection is greater than or equal to the probability threshold, the road recognition apparatus 720 controls the vehicle based on the identified preceding vehicle. Accordingly, a vehicle including the road recognition apparatus 720 enters and travels on an intersection in which a lane is not marked, even though it may not be possible to recognize the lane. The above follow mode may also be employed, according to an embodiment, in inclement weather such as a rain storm, blizzard, or other situation where the lane is not determinable and/or suitable navigation information is not determinable.

As described above, the road recognition apparatus 720 determines the probability that the vehicle is on the intersection, using a neural network. The neural network is trained by the training data generation apparatus, and the training data generation apparatus determines the probability that the vehicle is on the intersection, based on a location at which an image is captured. Accordingly, the road recognition apparatus 720 more accurately determines the probability that the vehicle is on the intersection. Also, the road recognition apparatus 720 more accurately determines whether to control the vehicle based on the identified lane or to control the vehicle based on the identified preceding vehicle.

The road recognition apparatus 720 determines whether the determined road information includes an error. For example, when the determined road information includes an error, the road recognition apparatus 720 requests the training data generation apparatus to generate training data. When a neural network is not trained, the determined road information includes an error.

In an example, it is assumed that a neural network is trained based on training data and an image of a road of a predetermined country and that a vehicle including the road recognition apparatus 720 travels on a road of another country. In this example, an image received by the road recognition apparatus 720 includes a lane or traffic lights different from that of the country. Also, because the above countries follow different traffic rules, there is a difference in whether traffic keeps to the right or to the left. Because the neural network is not trained on the image received by the road recognition apparatus 720, information determined by the road recognition apparatus 720 includes an error.

In another example, when a vehicle including the road recognition apparatus 720 travels in an environment in which a neural network is relatively slightly trained, information determined by the road recognition apparatus 720 includes an error. For example, a neural network is assumed to be trained based on training data and an image captured on a clear day. In this example, when a vehicle including the road recognition apparatus 720 is exposed to rain or snow or travels in a bad weather environment, information determined by the road recognition apparatus 720 includes an error. When a vehicle including the road recognition apparatus 720 that uses a neural network trained based on training data and an image captured during daytime travels during nighttime, information determined by the road recognition apparatus 720 includes an error.

The road recognition apparatus 720 determines, based on driver's feedback, whether the determined road information includes an error. In an example, a driver controls a vehicle to travel in an opposite direction to that of a shape of a road determined by the road recognition apparatus 720. In another example, when a vehicle including the road recognition apparatus 720 is travelling without an operation of a driver, the driver manually controls the vehicle by operating a steering wheel or a brake pedal. In this example, the road recognition apparatus 720 determines that information associated with a road includes an error.

When the determined road information is determined to include the error, the road recognition apparatus 720 sends a request to generate the training data to the training data generation apparatus. While sending the request, the road recognition apparatus 720 transmits the image and the location at which the image is captured to the training data generation apparatus. Accordingly, the neural network is trained by the training data generation apparatus while being used by the road recognition apparatus 720.

Figure 8:
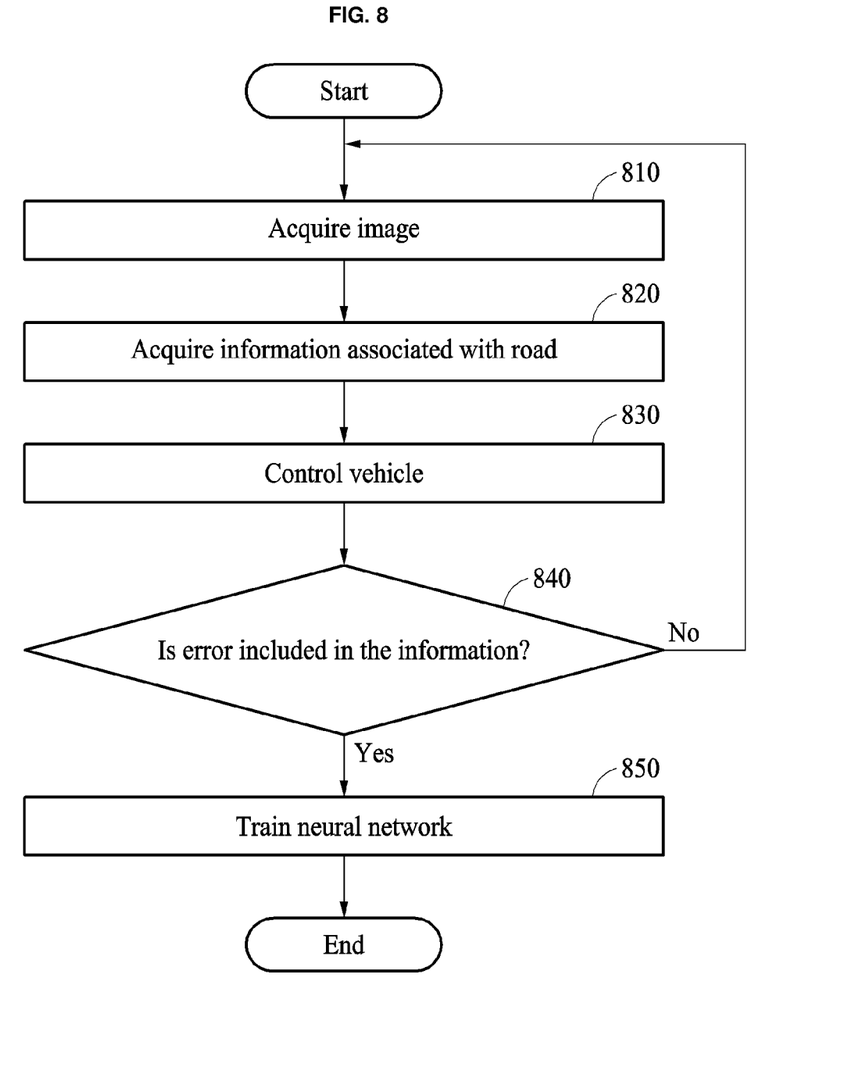
FIG. 8 is a flowchart illustrating an example of a process performed by a road recognition apparatus.

FIG. 8 illustrates an example of a process performed by a road recognition apparatus. The road recognition apparatus uses a neural network trained by a training data generation apparatus.

Referring to FIG. 8, in operation 810, the road recognition apparatus acquires an image by capturing a road on which a vehicle travels. The image is transmitted in real time to the road recognition apparatus from a camera of a vehicle including the road recognition apparatus.

In operation 820, the road recognition apparatus determines information associated with the road by inputting the acquired image to a neural network that is trained by machine learning. For example, the road recognition apparatus determines, as the information associated with the road, a lane of the road, a preceding vehicle that travels on the road, a probability that the road is an intersection, a number of accessible roads, a gradient of the road, a probability that the road is drivable, and a shape of the road.

In operation 830, the road recognition apparatus controls the vehicle including the road recognition apparatus based on the determined information. The road recognition apparatus determines whether to control the vehicle based on an identified lane or to control the vehicle based on an identified preceding vehicle. For example, based on a probability that a road is an intersection, the road recognition apparatus determines whether to control the vehicle based on the identified lane or to control the vehicle based on the identified preceding vehicle.

In operation 840, the road recognition apparatus determines whether the determined information includes an error. For example, the road recognition apparatus compares the determined information to an operation by which a driver controls the vehicle, as described above with reference to FIG. 7, and determines whether the determined information includes an error. The road recognition apparatus determines whether the determined information is similar to a road on which the vehicle travels from the image.

When the determined information is determined to include the error, the road recognition apparatus trains the neural network in operation 850. When the determined information is different from the road on which the vehicle travels, the road recognition apparatus trains the neural network again. For example, the road recognition apparatus sends, to the training data generation apparatus, a request to generate training data based on an image and a location at which the image is captured. In response to the request, the training data generation apparatus generates the training data, and trains the neural network. Thus, the road recognition apparatus trains the neural network in real time based on the road on which the vehicle travels.

The apparatuses, units, modules, devices, and other components illustrated in FIGS. 2 and 7 that perform the operations described herein with respect to FIGS. 1, 3-6, and 8 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1, 3-6, and 8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A training data generation method, comprising:
    acquiring an image captured from a vehicle and location information of the vehicle corresponding to the image;
    acquiring map data corresponding to the acquired location information;
    determining truth data comprising information associated with a road included in the image from the acquired map data, wherein the truth data comprises a probability that the road is drivable, wherein the probability is determined based on an angle between the road and a direction corresponding to an orientation of the image, and wherein the orientation of the image corresponds to a front view from the vehicle; and
    generating training data comprising the image and the determined truth data.

2. The training data generation method of claim 1, wherein the acquiring of the map data comprises acquiring the map data by digital searching of a map database (DB) based on the acquired location information.

3. The training data generation method of claim 1, wherein the acquiring of the map data comprises acquiring the map data based on the direction corresponding to the orientation of the image.

4. The training data generation method of claim 1, wherein the truth data comprises a number of roads accessible by the vehicle when the vehicle moves forward.

5. The training data generation method of claim 1, wherein the truth data comprises a gradient of the road determined based on first coordinates of a location of the vehicle corresponding to the image and second coordinates adjacent to the first coordinates.

6. The training data generation method of claim 1, wherein the truth data comprises a probability that the road is matched to a predetermined road type.

7. A training data generation apparatus for generating training data from an image captured from a vehicle, the training data generation apparatus, comprising:
    a processor configured:
        to acquire the image and location information of the vehicle corresponding to the image;
        to acquire map data corresponding to the acquired location information;
        to determine truth data comprising information associated with a road included in the image from the acquired map data, wherein the truth data comprises a probability that the road is drivable, wherein the probability is determined based on an angle between the road and a direction corresponding to an orientation of the image, and wherein the orientation of the image corresponds to a front view from the vehicle; and
        to generate training data comprising the image and the determined truth data.

8. The training data generation apparatus of claim 7, wherein the processor is further configured to acquire the map data by digital searching of a map database (DB) based on the acquired location information.

9. The training data generation apparatus of claim 7, wherein the processor is further configured to acquire the map data based on the direction corresponding to the orientation of the image and configured to determine truth data comprising a probability that the vehicle moves in the direction.

10. The training data generation apparatus of claim 7, wherein the truth data comprises a probability that the road is matched to a predetermined road type.

* * * * *